United States Patent [19]
Berglund

[11] 3,885,167
[45] May 20, 1975

[54] APPARATUS AND METHOD FOR CONNECTING BETWEEN SERIES AND PARALLEL DATA STREAMS

[75] Inventor: Carl Neil Berglund, Ottawa, Ontario, Canada

[73] Assignee: Bell Telephone Laboratories, Incorporated, Murray Hill, N.J.

[22] Filed: Aug. 8, 1973

[21] Appl. No.: 386,774

[52] U.S. Cl. ............. 307/221 C; 307/243; 307/244; 307/304
[51] Int. Cl. ...................... G11c 19/00; H03k 17/00
[58] Field of Search ........ 307/221 R, 221 C, 221 D, 307/304, 243, 244

[56] References Cited

UNITED STATES PATENTS

| | | | |
|---|---|---|---|
| 3,609,392 | 9/1971 | Tetik | 307/221 C |
| 3,656,011 | 4/1972 | Weinberg | 307/221 |
| 3,763,480 | 10/1973 | Weimer | 307/221 C |
| 3,764,824 | 10/1973 | Sangster | 307/221 C |
| 3,789,240 | 1/1974 | Weimer | 307/221 C |

OTHER PUBLICATIONS

Special Report in "Electronics" by Kovac et al., Feb. 28, 1972, pages 72–77.

*Primary Examiner*—Stanley D. Miller, Jr.
*Attorney, Agent, or Firm*—P. Abolins; P. V. D. Wilde

[57] ABSTRACT

Apparatus and method for converting between series and parallel data streams. In a charge transfer device (CTD) shift register having $2^M$ (M is an integer greater than one) parallel registers each having an input node and an output node, a CTD input logic tree connects all the input nodes to a single data input node, and a CTD output logic tree connects all the output nodes to a single data output node. The input logic tree successively splits up an input data stream into two data streams until the number of data streams is $2^M$ and the output logic tree successively combines data streams from each output node two at a time until a single output data stream is achieved.

25 Claims, 6 Drawing Figures

APPARATUS AND METHOD FOR CONNECTING BETWEEN SERIES AND PARALLEL DATA STREAMS

BACKGROUND OF THE INVENTION

This invention relates to information processing; and, more particularly, to a semiconductor apparatus and method for storing and sequentially transferring signals which represent information.

In a wide variety of electrical and electronic apparatus, the storage and manipulation of signals which represent information is an essential feature. Semiconductor apparatus adapted for the storage and manipulation of information are known in the art. For example, U.S. Pat. No. 3,660,697 issued on May 2, 1972, to C. N. Berglund and H. J. Boll teaches a serial connection of charge transfer devices for information transfer.

An article beginning on page 64 of the February 28, 1972, issue of Electronics describes a shift register which uses bucket brigade devices and has one input, one output and a plurality of intermediate parallel registers. A series-parallel conversion is done by serially connecting the first position of each of the parallel registers, serially applying input data to fill in turn all of the first positions, and then simultaneously shifting the data out of each of the first positions along its parallel register. The data shifts into the first positions are done at the data input shift rate which is higher than the shift rate along the intermediate parallel registers. For reasons of reducing power consumption and reducing data transfer loss it is desirable to reduce the number of shifts occurring at the higher data input rate.

The prior art also includes U.S. Pat. No. 3,656,011, issued to Z. A. Weinberg on April 11, 1972, which teaches a charge coupled device (CCD) shift register system having a common input to a plurality of parallel shift registers. A shift signal to each CCD storage cell of the parallel shift registers is a clock pulse with the same repetition rate but with a different phase so when a signal is applied to the common input only one register accepts the signal. That is, each CCD storage cell of the parallel shift registers has an applied shift signal which is a train of pulses whose separation depends upon the number of parallel shift registers. It would be desirable to have a series-parallel conversion system which uses a more readily generated shift signal particularly when the number of parallel shift registers is larger than say four. Additionally, in the Weinberg patent the shifting of bits between CCD storage cells in each of the parallel shift registers is at least as frequent for a given bit as the shifting of a given bit in the input data stream. A lower shift rate would reduce the data transfer loss occurring from the shifts in a given time interval. This is because there would be a smaller total number of shifts and each shift would take longer thereby having a more efficient shift. Moreover, in accordance with the Weinberg patent each bit in a parallel shift register requires as many CCD storage cells as there are different phases of the shift signal. It would be desirable to reduce the number of CCD storage cells per bit. Furthermore, there are also shift register applications where it is desirable to invert in time sequence bits in a group; and it would be desirable to have a shift register which readily accomplishes this inversion.

Therefore, an object of this invention is a charge transfer device shift register which reduces power consumption, reduces data transfer loss, and improves inversion in time sequence of data bits. In particular, an object of this invention is a charge transfer device adapted for series-parallel and parallel-series conversion to reduce the shift signal repetition rate, to reduce the number of data shifts, and to use a shift signal relatively simple to generate.

SUMMARY OF THE INVENTION

To these and other ends, the invention is a charge transfer device shift register structure and a method for using it. Conversion means included in the invention first convert a single series data input stream to $2^M$ (M is an integer greater than one) parallel input data streams and subsequently convert $2^M$ parallel data output streams to a single data output stream. In particular, charge transfer device means included in the conversion means form an input logic tree which successively divides alternate bits of data from the input data stream between two data streams until there are $2^M$ data streams, each stream being applied to an input node of a different parallel intermediate shift register. Similarly, additional charge transfer device means included in the conversion means take the output data streams from the $2^M$ output nodes of the parallel intermediate shift registers and successively combine two output data streams into one output data stream until there is a single output data stream. Accordingly, there is formed an output logic tree which is inversely analogous to the input logic tree.

Consequently, in accordance with this invention, $2^M$ data streams are formed from one data stream by an M-level input logic tree. To this end, there is a shift signal applied to the charge transfer device storage cells in each level of the logic tree. The repetition rate of the shift signal for a given level is one-half the repetition rate of the previous level. That is, the initial input level of the tree operates at the same rate as the input data repetition rate, the next level, which is the first level at which a division of data takes place, operates at one-half the input data repetition rate, and the $M^{th}$ level of division operates at a repetition rate which is the input repetition rate divided by $2^M$. Accordingly, only the initial shift of the series-parallel conversion is done at the higher input data repetition rate. Subsequent shifts are done at decreasing repetition rates. This is advantageous because it reduces the power consumption. Furthermore, after an initial input shift, an individual bit of information is shifted only M times, that is, through M-levels, to split the input data stream into $2^M$ parallel data streams. Reducing the number of data shifts reduces the cumulative loss in data power and therefore increases total transfer efficiency.

The output logic tree operates in an inversely analogous manner to the input logic tree. That is, each combining of two data streams into one data stream is done by two charge transfer device storage cells having separate inputs and a common output. The two charge transfer device storage cells each have an applied shift signal having the same phase and a frequency which is twice that of the shift signal of the previous level of charge transfer device storage cells. However, while the shift signals of the previous level all are of the same frequency, the shift signals which shift the data stream for the two inputs are each of a different phase. Therefore, at a given time, only one of the two charge transfer device storage cells is receiving an input data stream. This condition of a single input stream distinguishes the input and output logic trees. In this manner, $2^M$ parallel data streams are eventually combined into a single output data stream.

Between the $2^M$ input nodes and the $2^M$ output nodes are $2^M$ parallel intermediate shift registers, each connected to one of the input nodes and to one of the output nodes. The repetition rate of the shift signal applied to the storage cells of the parallel intermediate shift registers is the input data repetition rate divided by $2^M$, that is, the same repetition rate as the final level of the input logic tree and the initial level of the output logic tree. The advantages of operating a plurality of parallel shift registers instead of a single shift register are well known and include fewer transfers, thus increasing efficiency, lower frequency of applied shift signals, thus reducing power consumption, and reducing both the need for regenerators and the space needed to provide shift signal conncetions to the charge transfer devices.

DETAILED DESCRIPTION

Figure 1:
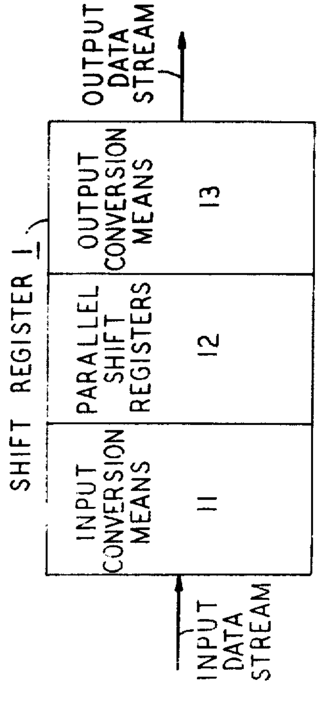
FIG. 1 shows a block diagram of a shift register in accordance with this invention.

With reference now to the drawing, FIG. 1 shows a block diagram of a shift register 1 in accordance with this invention. Input data is applied to an input conversion means 11 which, in turn, applies the input data to $2^M$ parallel shift registers 12. Data streams from the parallel shift registers 12 are received by an output conversion means 13 which produces a single output data stream.

Figure 2:
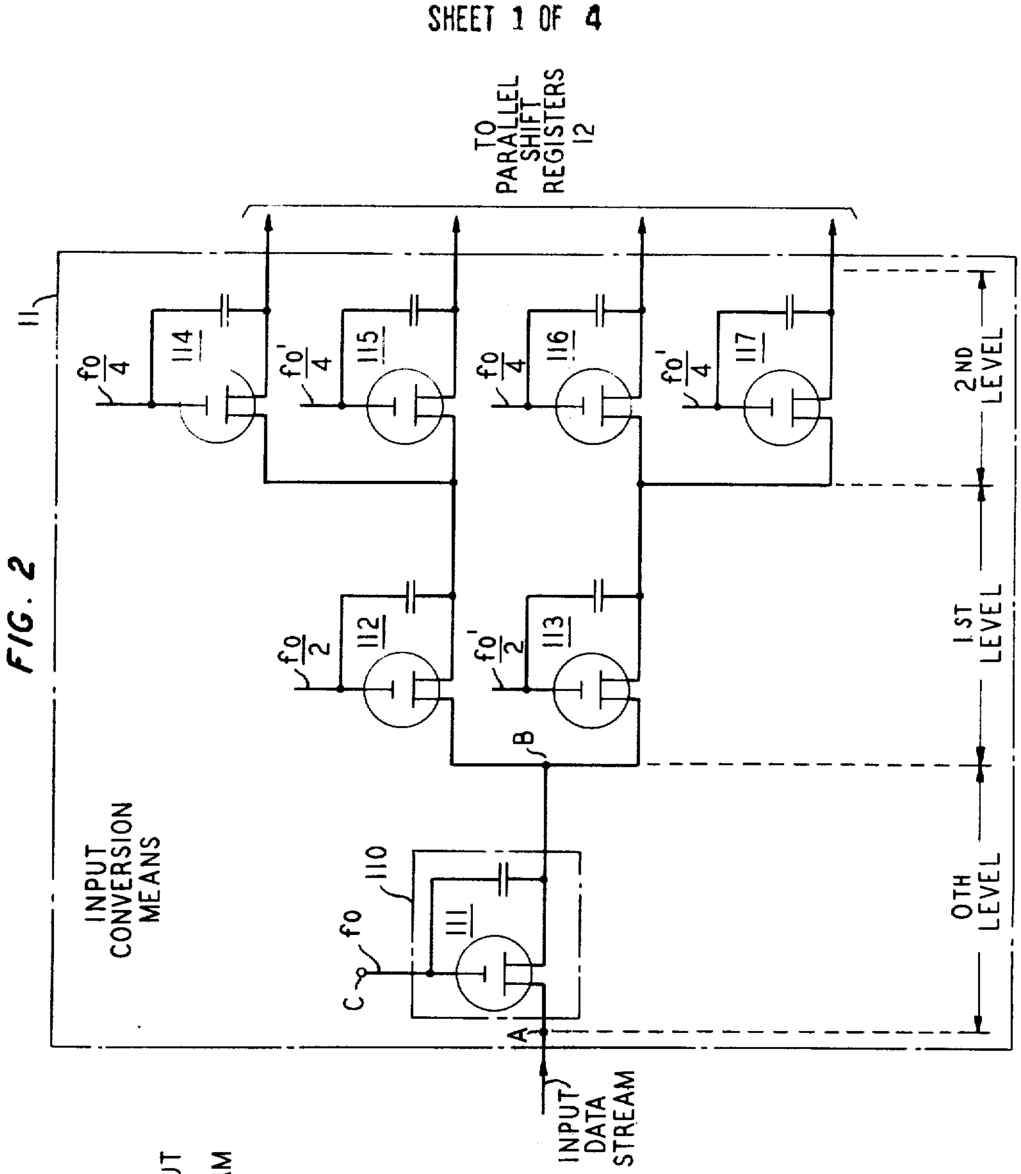
FIG. 2 shows a schematic diagram of a typical bucket brigade device connection in accordance with this invention for use within block 11 of FIG. 1.

FIG. 2 shows an example of a schematic diagram of a typical circuitry used within input conversion means 11 of FIG. 1. This particular embodiment of the invention uses bucket brigade devices as the charge transfer devices. That is, dashed block 110 contains the elements of a storage cell used repetitively to connect conversion means 11. It can be seen that a storage cell 111 within block 110 has an input node A, an output node B, and a shift node C for applying a shift signal. By connecting the output of one storage cell to the inputs of two sequential storage cells an input logic tree is formed. The circuitry shown within FIG. 2 shows an example of an M-level input logic tree where M equals 2, thereby producing $2^M$, or 4, parallel data streams. An initial input level is denoted as the $O^{th}$ level in FIG. 2 and includes storage cell 111 which receives the input data stream at the input node A. A first level includes storage cells 112 and 113, and a second level includes storage cells 114, 115, 116 and 117. The input nodes of storage cells 112 and 113 are both connected to the output node of storage cell 111, shown as node B. The inputs of storage cells 114 and 115 are both connected to the output of storage cell 112 and, similarly, the inputs of storage cells 116 and 117 are both connected to the output of storage cell 113. The outputs of storage cells 114, 115, 116 and 117 are each connected to a different parallel shift register.

In operation, an input data signal is applied to node A and then is shifted to node B at a repetition rate determined by the shift signal applied to node C. The repetition rate of the signal applied to the shift terminal of the $O^{th}$ level is the same as the input data repetition rate, in this case designated as $f_0$. The shift signal applied to storage cells 112 and 113 is such that only one of those two storage cells accepts the output signal of storage cell 111. That is, the shift signals applied to the two first level storage cells are of opposite phase and have a repitition rate one-half the repetition rate of the shift signal applied to the $O^{th}$ level storage cell 111 so when the $O^{th}$ level storage cell conducts, only one of the two first level storage cells is also conducting. In this case, the applied shift signal is designated as $f_0/2$ for storage cell 112, and $f_0'/2$ for storage cell 113. The prime indicates that the signal is of a different phase. For example, if $f_0$ is a square wave, then $f_0/2$ would be a square wave with half the frequency and $f_0'/2$ would be 180° out of phase with $f_0/2$.

In the second level of fanout shown in FIG. 2, storage cells 114 and 116 have an applied shift signal of $f_0/4$ and storage cells 115 and 117 have an applied shift signal of $f_0'/4$. Analogous to the operation at the previous level either storage cell 114 or 115 receives the output of storage cell 112 and either storage cell 116 or 117 receives the output of storage cell 113.

Of course, by adding successive levels of fanout and by having shift signal repetition rates which are one-half of the repetition rate of the previous level, a single series data input stream is converted to more than four parallel data streams. That is, $2^M$ data streams are provided by having M-levels of tree-like splitting in the input conversion means.

Figure 3:
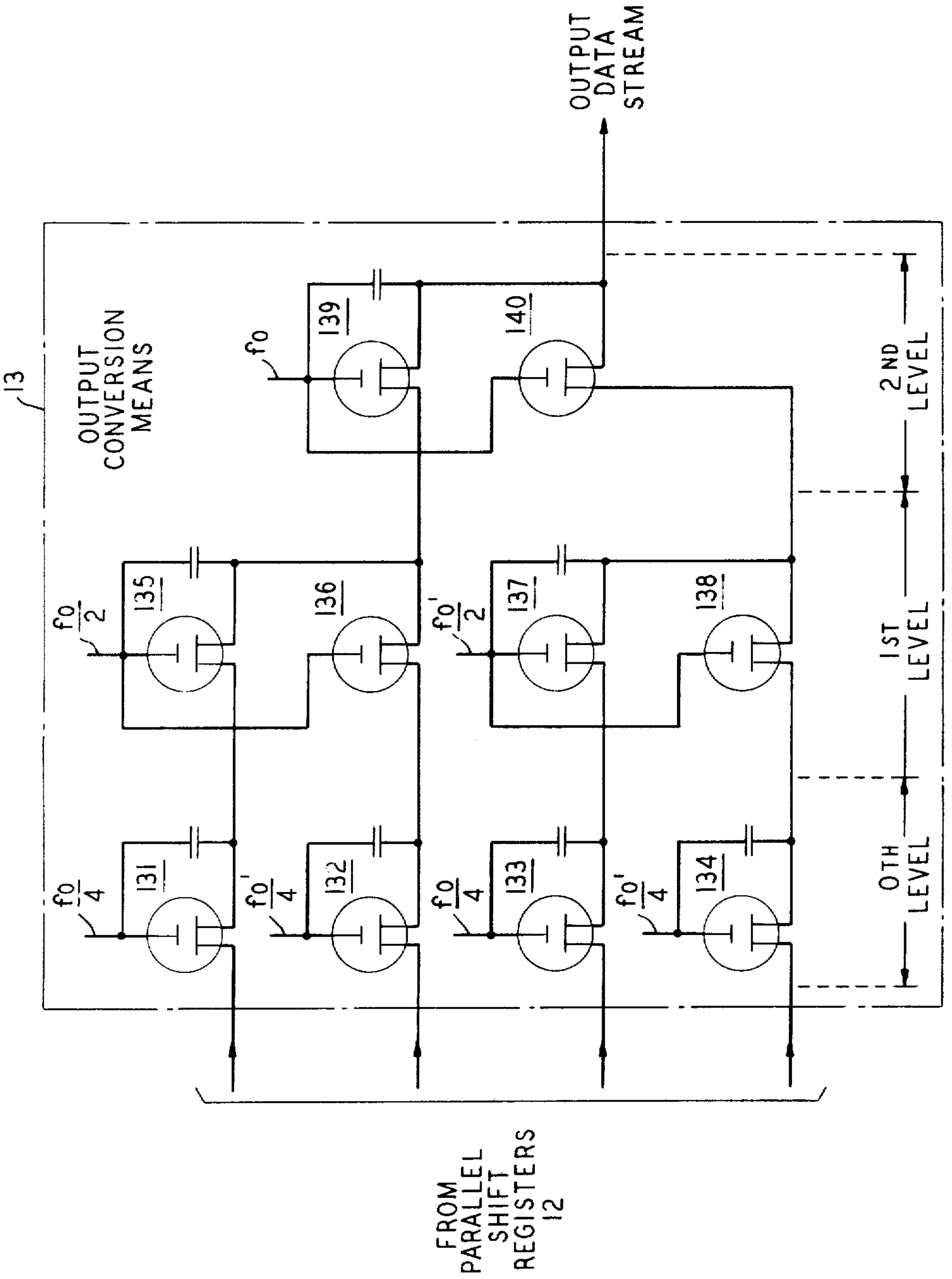
FIG. 3 shows a schematic diagram of a typical bucket brigade device connection in accordance with this invention for use within block 13 of FIG. 1.

With reference now to FIG. 3, there is shown a schematic diagram of a specific circuit appropriate for use in accordance with this invention as output conversion means 13 of FIG. 1. The particular circuitry shown is a two level bucket brigade device output conversion means and can be used in conjunction with the just described two levels input conversion means. More specifically, FIG. 3 shows the connection of storage cells for converting four parallel output data streams from four intermediate shift registers operating at a repetition rate of $f_0/4$ into a single output data stream with a repetition rate of $f_0$. The $O^{th}$ level of the output conversion means includes four storage cells designated as 131, 132, 133 and 134. The applied shift signal is designated as $f_0/4$ for storage cells 131 and 133 and $f_0'/4$ for storage cells 132 and 134.

The first, 1st, level of output conversion contains four storage cells designated 135, 136, 137 and 138. The inputs of the four storage cells are separate, but the outputs are joined in two pairs. More specifically the input of storage cell 135 is connected to the output of storage cell 131, the input of storage cell 136 is connected to the output of storage cell 132, the input of storage cell 137 is connected to the output of storage cell 133, and the input of storage cell 138 is connected to the output of storage cell 134. The outputs of storage cells 135 and 136 are connected together as are the outputs of storage cells 137 and 138.

In operation, the shift signal repetition rate applied to the 1st level storage cells is twice that applied to the previous, $O^{th}$ level storage cells. The phases are the same of the shift signals applied to 1st level storage cells having a common output, but the phases are different of the shift signals applied to those $O^{th}$ level storage cells which provide an input for those 1st level storage cells having a common output. Accordingly, at a given time only one of the two output leads of storage cells 131 and 132 provides an input to either storage cell 135 or 136 and, similarly, only one of the output leads of storage cells 133 and 134 provides an input to either storage cell 137 or 138. Operating two storage cells with the same shift signal to combine two data streams into one data stream contrasts with operating two storage cells with shift signals of different phases to split one data stream into two data streams. As a result, the output conversion means is not a straightforward reversal of the input conversion means.

In this particular embodiment, the final level of output conversion is the second level which includes storage cells 139 and 140. The input of storage cell 139 is connected to the joined outputs of storage cells 135 and 136, and the input of storage cell 140 is connected to the joined outputs of storage cells 137 and 138. The outputs of the two storage cells in the second level are joined together to form the desired single output data stream. The shift signal applied to the two second level storage cells is $f_O$, which has the same repetition rate as the output data stream shift signal and twice the repetition rate of the shift signal applied to the previous level. In a manner analogous to the previous level, only one of the two pairs of storage cells of the first level provides an input at any given time to the two storage cells of the second level.

Figure 4:
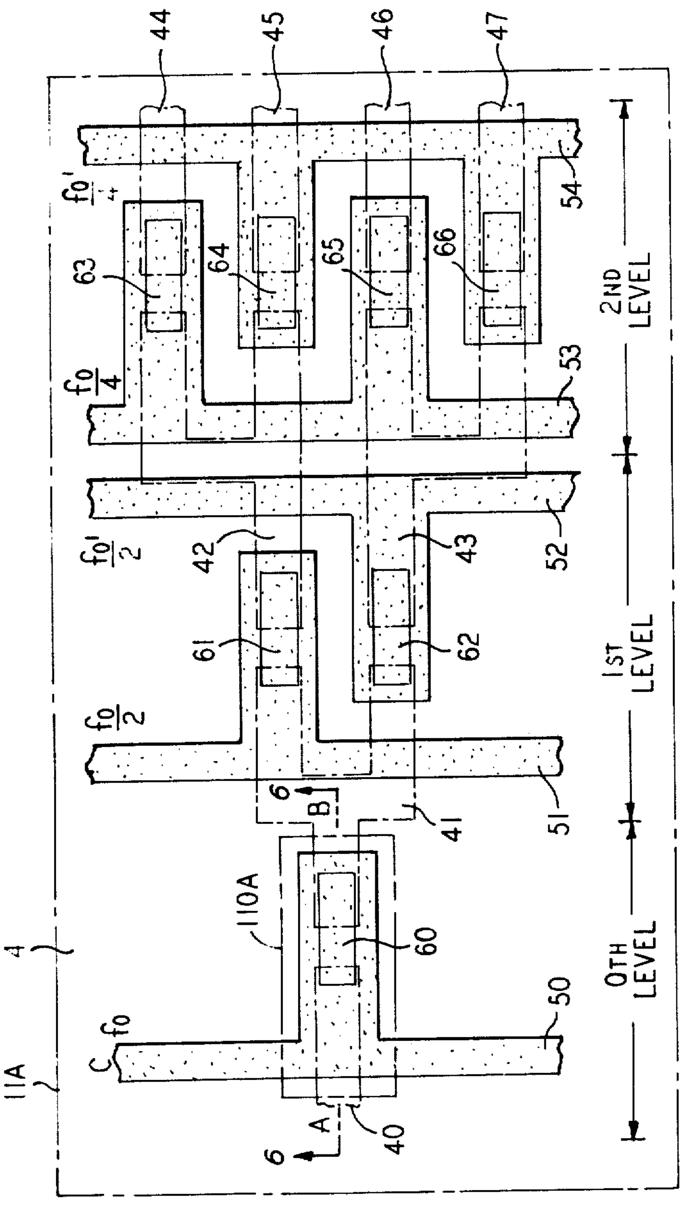
FIG. 4 shows the plan view of an example of a wafer structure in accordance with the typical connection of FIG. 2.

FIG. 4 shows an example of a plan view of an integrated circuit which is laid out in accordance with the schematic drawing of FIG. 2 and can be used within the input conversion means 11 of FIG. 1. Dashed block 11A of FIG. 4 corresponds to dashed block 11 of FIG. 2 and dashed block 110A of FIG. 4 corresponds to dashed block 110 of FIG. 2. Also, nodes A, B and C of FIG. 4 correspond to nodes A, B and C of FIG. 2. For clarity, a cross section 6 of a portion of the integrated circuit within block 110A of FIG. 4 is shown in FIG. 6 and will be discussed before further discussion of FIG. 4.

Figure 6:
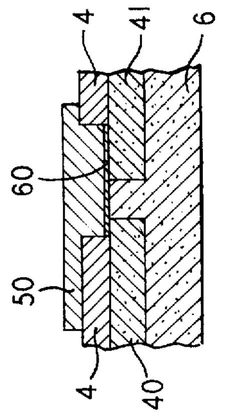
FIG. 6 shows a cross section of a portion of the wafer structure shown in FIG. 4.

In FIG. 6, a semiconductor substrate 6 is shown to be partially covered by an insulating layer 4. Substrate 6 contains impurity regions 40 and 41 which have a conductivity type opposite from the substrate's conductivity type. A metallization 50 is shown above a thin insulating region 60. Note that the thin insulating region 60 is below a correspondingly thicker portion of metallization 50. It is the metallization above region 60 which acts as a gate to control the flow of charge carriers representing information between impurity regions 40 and 41. It should also be noted that region 60 overlaps impurity region 41 more than it overlaps impurity region 40 thereby forming a capacitance which acts to store charge.

In accordance with FIG. 6, FIG. 4 also shows the insulating layer 4, the impurity regions 40 and 41, the metallization 50 and the thin insulating region 60. In accordance with the schematic diagram of FIG. 2, the output of one storage cell is connected to the inputs of two sequential storage cells. In particular, as can be seen in FIG. 4, impurity region 41 forms an output path of the zero level storage cell and then splits into two paths thereby forming two input paths to the two sequential storage cells of the first level. It can also be seen that impurity regions 42 and 43 similarly split into two paths thereby again providing two inputs from one output.

Also in accordance with the schematic diagram of FIG. 2, the shift signal $f_O$ is shown in FIG. 4 as being applied to metallization 50 which thereby acts as a gate. In a like manner, the shift signal $f_O/2$ is applied to a metallization 51 and thereby acts through a thin insulating region 61 to control the flow of charge carriers representing information between the impurity regions 41 and 42. Similarly, the shift signal $f_O'/2$ is applied to a metallization 52 which acts through a thin insulating region 62 to control the flow of charge carriers between the impurity regions 41 and 43. Also similarly, the shift signal $f_O/4$ is applied to a metallization 53 and the shift signal $f_O'/4$ is applied to a metallization 54. Accordingly, these shift signals act to control the flow of charge carriers between the impurity region 42 and an impurity region 44, the impurity region 42 and an impurity region 45, the impurity region 43 and an impurity region 46, and the impurity region 43 and an impurity region 47 by acting through thin insulating regions 63, 64, 65 and 66, respectively.

Figure 5:
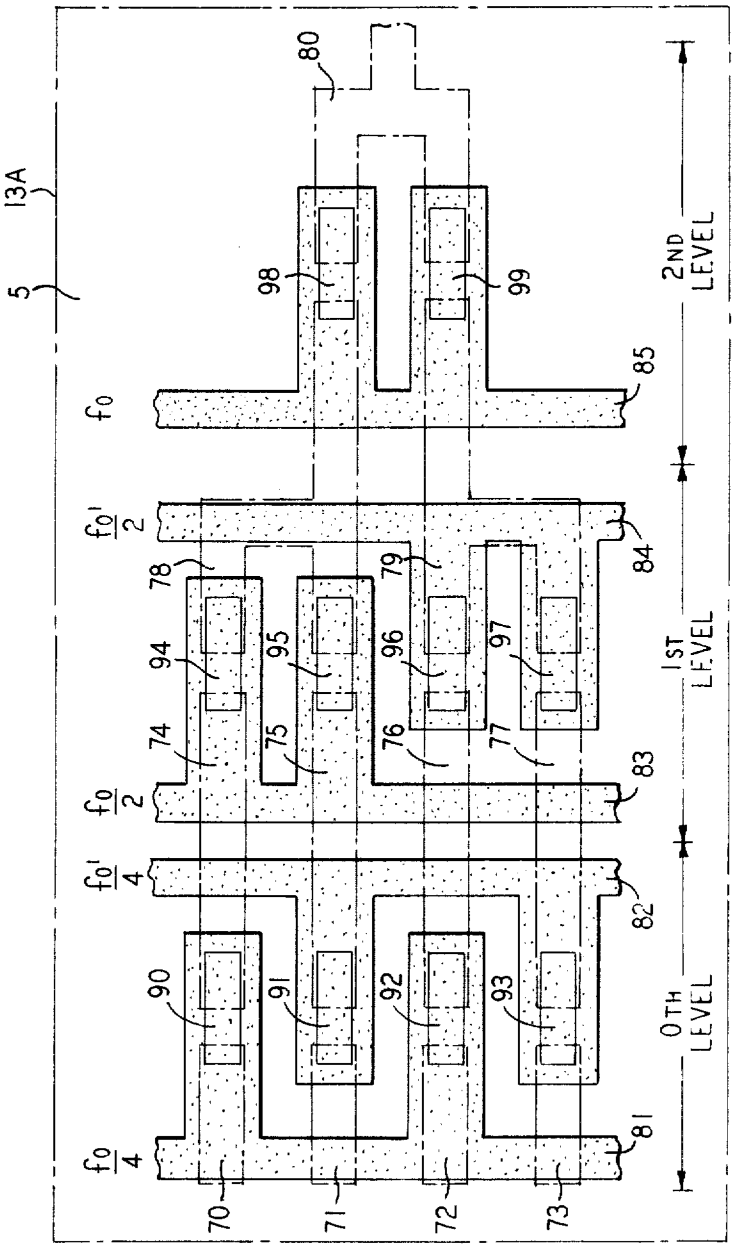
FIG. 5 shows the plan view of an example of a wafer structure in accordance with the typical connection of FIG. 3.

FIG. 5 shows an example of the plan view of an integrated circuit which is laid out in accordance with the schematic drawing of FIG. 3 and can be used within the output conversion means 13 of FIG. 1. The cross sectional view of FIG. 6 is also typical of portions of the structure of the integrated circuit of FIG. 5. In a manner inversely analogous to the input conversion means, the output conversion means has impurity regions 78, 79 and 80 which have two paths converging into a single path thereby connecting the output of two storage cells to the input of one storage cell. As in the input conversion means, there is a metal gate which controls the flow of charge carriers representing information between two impurity regions. More specifically, in the $O^{th}$ level the shift signal $f_O/4$ is applied to a metallization 81 and thereby acts through a thin insulating regions 90 and 92 to control the charge carrier flow between an impurity region 70 and an impurity region 74, and an impurity region 72 and an impurity region 76, respectively. Similarly, the shift signal $f'_O/4$ is applied to a metallization 82 and thereby acts through thin insulating regions 91 and 93 to control the flow of charge carriers between an impurity region 71 and an impurity region 75, and an impurity region 73 and an impurity region 77, respectively.

In the first level of FIG. 5, which corresponds to the first level of FIG. 3, the shift signal $f_O/2$ is applied to a metallization 83 and shift signal $f'_O/2$ is applied to a metallization 84. Shift signal $f_O/2$ controls the charge carrier flow between the impurity region 74 and an impurity region 78 by acting through a thin insulating region 94 and between the impurity region 75 and the impurity region 78 by acting through a thin insulating region 95; shift signal $f'_O/2$ controls the charge carrier flow between the impurity region 76 and an impurity region 79 by acting through a thin insulating region 96 and between the impurity region 77 and the impurity region 79 by acting through a thin insulating region 97.

In the second level of FIG. 5, the shift signal $f_0$ is applied to a metallization 85 and thereby acts through a thin insulating region 98 and a thin insulating region 99 to control charge carrier flow between the impurity region 78 and an impurity region 80, and the impurity region 79 and the impurity region 80, respectively.

A conversion means in accordance with this invention is particularly advantageous for inverting the time sequence of groups of data bits. By substituting the inverse phase for a given shift signal, e.g., $f'_0/2$ for $f_0/2$, one bit or a group of bits which is a multiple of two can be inverted. For example, an input sequence of 1, 2, 3, 4 can become an output sequence of 2, 1, 4, 3.

While the conversion means have been shown using bucket brigade devices, other charge transfer devices could also be used. For example, an embodiment of the invention can use charge coupled devices wherein the impurity regions and electrodes of the bucket brigade device embodiment are eliminated and replaced by metal gate electrodes insulated from the underlying semiconductor substrate. The CCD electrodes are shaped similarly to the plan view of the bucket brigade device impurity regions and therefore either split one path into two paths or combine two paths into one path.

More particularly, each CCD electrode can be formed in accordance with the two level electrode structure disclosed in U.S. Pat. No. 3,651,349 issued to D. Kahng and E. H. Nicollian on Mar. 21, 1972. As disclosed there, each gate electrode is disposed over a portion of a dielectric layer having at least two distinct thicknesses under the gate electrode. When a potential is applied to the gate electrode an asymmetrical potential well will be induced under the gate electrode because the strength of the potential at any point on the underlying semiconductor surface electrode is inversely proportional to the thickness of the dielectric layer between the gate electrode and that surface point. This asymmetry can be induced in a form such as to enhance the transfer of excess minority carriers in a predetermined direction and to impede the transfer of those carriers in the opposite direction.

Modifying the bucket brigade device structure shown in FIG. 4, one gate electrode of a charge coupled device would cover a dielectric layer above one impurity region and above the separation region between that impurity region and the preceding impurity region nearer the input. However, the thickness of the dielectric layer over the area above the impurity region would be thin in comparison to the thickness of the dielectric layer above the separation area. That is, the gate electrode would be stepped and have the higher step nearer the input. A shift signal $f_0$, having the same repetition rate as the input data stream, is applied to the first electrode of the charge coupled device which splits the input data path into two data paths. The shift signal applied to the next level of two electrodes is $f_0/2$ to one of the electrodes and $f'_0/2$ to the other electrode. Each of the resulting four paths is coupled to one electrode which is operated either at $f_0/4$ or $f'_0/4$ in an analogous manner to the connections of the shift signal shown in FIG. 4.

Similarly, an output conversion means structure using charge coupled devices is analogous to the output bucket brigade device structure shown in FIG. 5. That is, as in the input means, impurity regions are eliminated and replaced by metal gate electrodes insulated from the underlying semiconductor substrate. Moreover, one gate electrode covers a dielectric layer above one impurity region and above the separation region between that impurity region and the preceding impurity region nearer the input. The dielectric layer has a relatively thicker portion over the separation region and a relatively thinner portion over the area defined by the impurity region. The shift signals applied to the gate electrodes are analogous to the shift signals used in the output conversion means using bucket brigade devices shown in FIG. 5. That is, at each level where the number of data paths is halved the repetition rate of the shift signal is doubled.

Various other modifications and variations will no doubt occur to those skilled in the various arts to which this invention pertains. For example, an embodiment of the invention can include more than one type of charge transfer device. Of course, extension of the conversion means beyond two levels is within the scope of the invention.

What is claimed is:

1. A charge transfer device shift register comprising $2^M$ (M is an integer greater than one) parallel intermediate shift registers each register having an input node to receive an input data stream and an output node to provide an output data stream, and conversion means for applying data from an input data stream to the register input nodes, wherein the improvement comprises:

charge transfer device input means included in the conversion means and connected as an M-level input logic tree, and means included in the conversion means for providing shift control of the charge transfer device input means thereby successively dividing alternate bits of data from the input data stream between two data streams until there are $2^M$ data streams each stream being applied to a different register input node, the shift control having a different repetition rate at different levels of the input logic tree.

2. Apparatus as recited in claim 1 wherein the charge transfer device input means for dividing the data from a first input data stream flowing in a first input path between a second input data stream flowing in a second input path and a third input data stream flowing in a third input path comprises:

a first charge transfer device storage cell having a shift terminal, an input node connected to the first input path and an output node connected to the second input path, a second charge transfer device storage cell having a shift terminal, an input node connected to the first input path and an output node connected to the third input path, and shift means connected to the shift terminals for producing a shift signal to repetitively make the first charge transfer device storage cell conducting while the second charge transfer device storage cell is nonconducting, and to repetitively make the second charge transfer device storage cell conducting while the first charge transfer device storage cell is nonconducting.

3. Apparatus as recited in claim 2 wherein the shift means comprises means to halve the repetition rate of the shift signal applied to charge transfer device storage cells at each successive level of the input logic tree.

4. Apparatus as recited in claim 2 wherein the first and second charge transfer device storage cells comprise:

a semiconductor substrate of a first conductivity type, a first and a second gate electrode disposed over a major surface of the substrate and insulated from the substrate, a first impurity zone of a second conductivity type formed in the substrate partially under the first gate electrode and partially under the second gate electrode, a second impurity zone of a second conductivity type formed in the substrate partially under the first gate electrode and having substantially more area under the first gate electrode than the first impurity region, and a third impurity zone of a second conductivity type formed in the substrate partially under the second gate electrode and having substantially more area under the second gate electrode than the first impurity region.

5. An apparatus as recited in claim 1 further comprising:

charge transfer device output means and means for applying shift control to the charge transfer device output means included in the conversion means for taking the output data streams from the $2^M$ shift register output nodes and successively combining alternate bits of data from two output data streams into one output data stream until there is an M-level logic tree formed with a single output data stream, the shift control having a different repetition rate at different levels of the output logic tree.

6. Apparatus as recited in claim 5 wherein the charge transfer device output means for combining a first output data stream flowing in a first output path and a second output data stream flowing in a second output path into a third output data stream flowing in a third output path comprises:

a first charge transfer device storage cell having a shift terminal, an input node connected to the first output path, and an output node connected to the third output path, a second charge transfer device storage cell having a shift terminal, an input node connected to the second output path and an output node connected to the third output path, and shift means connected to the shift terminals for producing a shift signal to repetitively make both charge transfer device storage cells alternately conducting and nonconducting.

7. Apparatus as recited in claim 6 wherein the shift means comprises means to double the repetition rate of the shift signal applied to charge transfer device storage cells at each successive level of the output logic tree.

8. Apparatus as recited in claim 6 wherein the first and second charge transfer device storage cells comprise:

a semiconductor substrate of a first conductivity type, a first and a second gate electrode disposed over a major surface of the substrate and insulated from the substrate, a first impurity zone of a second conductivity type formed in the substrate partially under the first gate electrode, a second impurity zone of a second conductivity type formed in the substrate partially under the second gate electrode, and a third impurity zone of a second conductivity type formed in the substrate partially under the first gate electrode with substantially more area under the first electrode than the first impurity region and partially under the second gate electrode with substantially more area under the second gate electrode than the second impurity region.

9. A charge transfer device shift register comprising $2^M$ (M is an integer greater than one) parallel intermediate shift registers each register having an input node to receive an input data stream and an output node to provide an output data stream, and conversion means for combining output data streams from the output nodes into a single output data stream, wherein the improvement comprises:

charge transfer device output means and means for applying shift control to the charge transfer device output means included in the conversion means for taking the output data streams from the $2^M$ shift register output nodes and successively combining alternate bits of data from two output data streams into one output data stream until there is an M-level logic tree formed with a single output data stream, the shift control having a different repetition rate at different levels of the output logic tree.

10. Apparatus as recited in claim 9 wherein the charge transfer device output means for combining a first output data stream flowing in a first output path and a second output data stream flowing in a second output path into a third output data stream flowing in a third output path comprises:

a first charge transfer device storage cell having a shift terminal, an input node connected to the first output path, and an output node connected to the third output path, a second charge transfer device storage cell having a shift terminal, an input node connected to the second output path and an output node connected to the third output path, and shift means connected to the shift terminals for producing a shift signal to repetitively make both charge transfer device storage cells alternately conducting and nonconducting.

11. Apparatus as recited in claim 10 wherein the shift means comprises means to double the repetition rate of the shift signal applied to charge transfer device storage cells at each successive level of the output logic tree.

12. Apparatus as recited in claim 10 wherein the first and second charge transfer device storage cells comprises:

a semiconductor substrate of a first conductivity type, a first and a second gate electrode disposed over a major surface of the substrate and insulated from the substrate, a first impurity zone of a second conductivity type formed in the substrate partially under the first gate electrode, a second impurity zone of a second conductivity type formed in the substrate partially under the second gate electrode, and a third impurity zone of a second conductivity type formed in the substrate partially under the first gate electrode with substantially more area under the first electrode than the first impurity region and partially under the second gate electrode with substantially more area under the second gate electrode than the second impurity region.

13. A method for transferring and storing data bits comprising applying data from an input data stream to the input nodes of $2^M$ (M is an integer greater than one) parallel, intermediate, charge transfer device shift registers and shifting the data along the parallel intermediate shift registers to the output nodes of the parallel intermediate shift registers, wherein the improvement comprises the steps of:

dividing successively M times using an input charge transfer device alternate bits of data from the input data stream between two data streams until there are $2^M$ data streams, wherein said dividing step includes the step of applying to the input charge transfer device shift control having a different repetition rate at different successive divisions, and applying each data stream to a different input node.

14. A method as recited in claim 13 wherein the division of alternate bits of data from one data stream between two data streams is provided by:

applying the data of one data stream to the input nodes of a first and a second charge transfer device storage cell, and controlling a data stream at each of the outputs of the two charge transfer device storage cells by applying a shift signal to each of the charge transfer device storage cells to repetitively make the first charge transfer device storage cell conducting while the second charge transfer device storage cell is nonconducting, and to repetitively make the second charge transfer device storage cell conducting while the first charge transfer device storage cell is nonconducting.

15. A method as recited in claim 14 wherein the shift signal applied to the charge transfer device storage cells is provided by halving the repetition rate of the shift signal applied to charge transfer device storage cells at each successive division of the input data stream.

16. A method as recited in claim 14 wherein applying the data of one data stream to the input nodes of a first and a second charge transfer device storage cell is provided by:

applying charge carriers representing data to an input impurity region of a first conductivity type in a substrate of a second conductivity type, the input impurity region forming the input of a first bucket brigade device storage cell and of a second bucket brigade device storage cell.

17. A method as recited in claim 14 wherein controlling a data stream at each of the outputs of the two charge transfer device storage cells is provided by:

applying shift signals to the gate electrodes of a first and a second bucket brigade device storage cell thereby controlling the flow of charge carriers representing data between the input impurity region and the output impurity region of each bucket brigade device storage cell.

18. A method as recited in claim 13 further comprising:

producing an output data stream at each of the output nodes of the $2^M$ parallel, intermediate, charge transfer device shift registers, and combining successively M times using an output charge transfer device alternate bits of data from two output data streams into one output data stream until there is a single output data stream wherein said combining step includes the step of applying to the output charge transfer device shift control having a different repetition rate at different successive combinations.

19. A method as recited in claim 18 wherein the successive combination of bits of data from a first and a second output data stream into a third output data stream is provided by:

applying the first output data stream to the input of a first charge transfer device storage cell, applying the second output data stream to the input of a second charge transfer device storage cell having a common output with the first charge transfer device storage cell, and controlling the third output data stream at the common output of the two charge transfer device storage cells by applying a shift signal to each of the charge transfer device storage cells alternately making both charge transfer device cells conducting and nonconducting.

20. A method as recited in claim 19 wherein successive combination of bits of data from a first and a second output data stream into a third output data stream is provided by:

applying charge carriers representing data of a first output stream to a first impurity region forming the input of a first bucket brigade device storage cell, applying charge carriers representing data of a second output stream to a second impurity region forming the input of a second bucket brigade device storage cell having a common output impurity region with the first bucket brigade device storage cell, and controlling the flow of charge carriers to the output impurity region by applying a shift signal to the gate electrodes of each of the bucket brigade device storage cells alternately making both bucket brigade device storage cells conducting and nonconducting.

21. A method as recited in claim 19 wherein the shift signal applied to the charge transfer device storage cells is provided by doubling the repetition rate of the shift signal applied to charge transfer device storage cells at each successive combination of output data streams.

22. A method for transferring and storing data bits comprising shifting the data along $2^M$ (M is an integer greater than one) parallel, intermediate charge transfer device shift registers to an output node and combining output data streams from the output nodes into a single output data stream, wherein the improvement comprises the steps of:

combining successively M times using an output charge transfer device alternate bits of data from two output data streams into one output data stream until there is a single output data stream wherein said combining step includes the step of applying to the output charge transfer device shift control having a different repetition rate at different successive combinations.

23. A method as recited in claim 22 wherein the successive combination of bits of data from a first and a second output data stream into a third output data stream is provided by:

applying the first output data stream to the input of a first charge transfer device storage cell, applying the second output data stream to the input of a second charge transfer device storage cell having a common output with the first charge transfer device storage cell, and controlling the third output data stream at the common output of the two charge transfer device storage cells by applying a shift signal to each of the charge transfer device storage cells alternately making both charge transfer device storage cells conducting and nonconducting.

24. A method as recited in claim 23 wherein a shift signal applied to the charge transfer device storage cells is provided by doubling the repetition rate of the shift signal applied to charge transfer device storage cells at each successive combination of output data streams.

25. A method as recited in claim 23 wherein successive combination of bits of data from a first and a second output data stream into a third output data stream is provided:

applying charge carriers representing data of a first output stream to a first impurity region forming the input of a first bucket brigade device storage cell, applying charge carriers representing data of a second output stream to a second impurity region forming the input of a second bucket brigade device storage cell having a common output impurity region with the first bucket brigade device storage cell, and controlling the flow of charge carriers to the output impurity region by applying a shift signal to the gate electrode of each of the bucket brigade device storage cells alternately making both bucket brigade device storage cells conducting and nonconducting.

* * * * *